May 17, 1927.
J. R. GAMMETER
1,628,836
APPARATUS FOR FORMING AND CUTTING PLASTIC MATERIAL
Filed Feb. 17, 1923
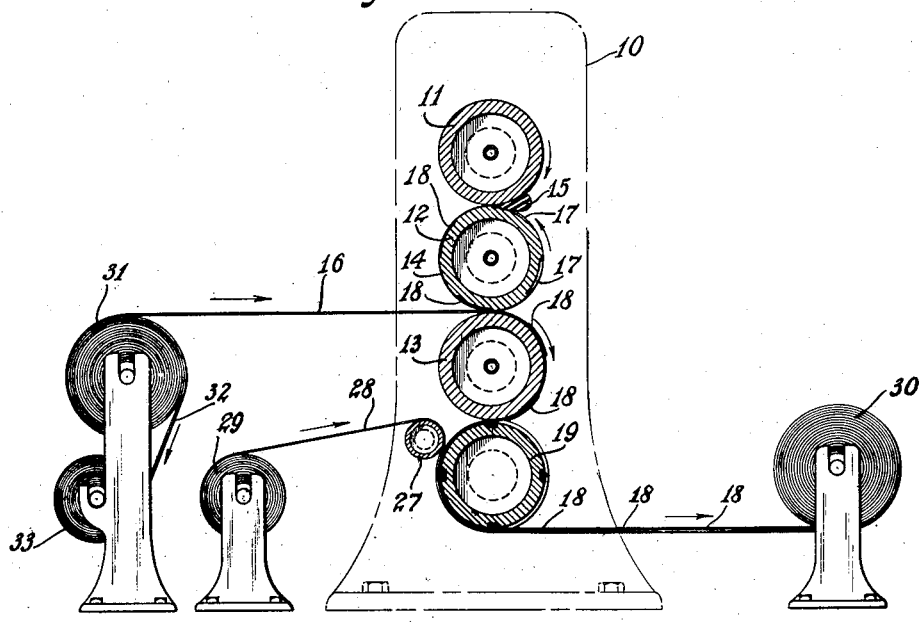
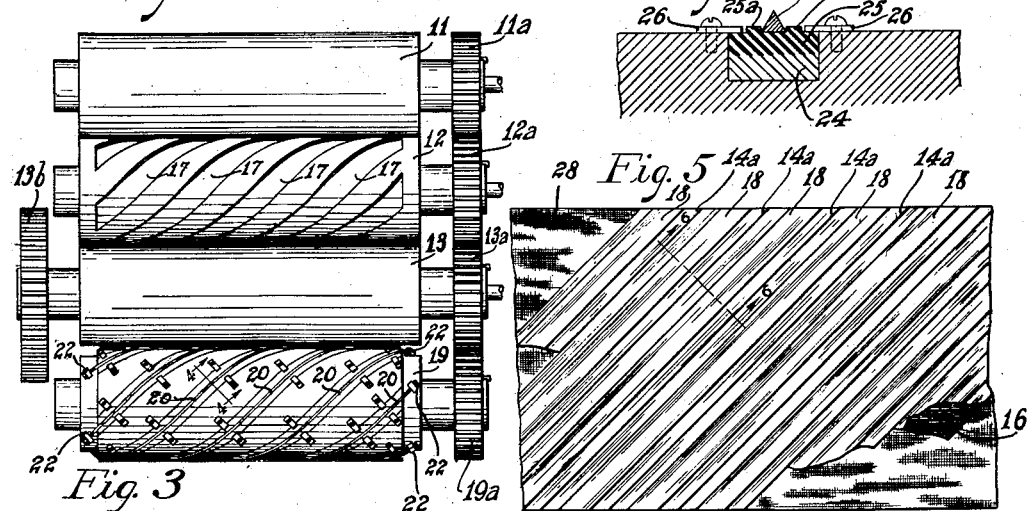
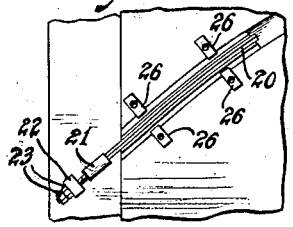
Inventor
John R. Gammeter.
By Robert M. Pierson
Atty.

Patented May 17, 1927.

1,628,836

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

APPARATUS FOR FORMING AND CUTTING PLASTIC MATERIAL.

Application filed February 17, 1923. Serial No. 619,598.

This invention relates generally to the forming and cutting of plastic material, and especially to the manufacture of plastic-coated strips of material such as the rubberized strips of weak-wefted or weftless fabric used in the building of pneumatic tire casings. Heretofore tire building strips have been produced by applying a rubber coating to a long length of fabric, said coating comprising relatively thick and thin zones disposed obliquely upon the length of fabric, and then, in a separate operation, cutting the fabric on the bias, between the thick zones of rubber, into tire strips.

My general object is to provide improved apparatus for forming and cutting plastic material. A more specific object is to provide apparatus adapted progressively to apply a rubber coating having thick and thin zones to a length of tire building material, and in the same operation automatically to sever individual tire building strips from said length of coated material.

Of the accompanying drawings:

Fig. 1 is an elevation, with parts in section, of apparatus embodying a preferred form of my invention.

Fig. 2 is an elevation of parts of my apparatus as viewed from the right of Fig. 1, other parts being omitted.

Fig. 3 is a large scale detail view of part of the apparatus shown in Fig. 2.

Fig. 4 is section on the line 4—4 of Fig. 2.

Fig. 5 is a plan view of a portion of the finished work, and a liner supporting the same, parts being broken away.

Fig. 6 is an enlarged section on line 6—6 of Fig. 5.

Referring to the drawings, 10 is a calender having a vertical series of even-speed rolls 11, 12, 13, of hollow construction and adapted to be heated by steam introduced in the usual manner through axial ports, the two upper rolls, 11 and 12, being adapted to form a sheet of rubber 14 from a bank of stock 15 thereon, and the roll 12 being adapted to press said sheet adhesively onto a continuous length of fabric 16, against the roll 13, as said fabric passes between the rolls 12, 13. The rolls 11 and 13 are smooth-surfaced, whereas the roll 12 is formed with shallow, spaced-apart, helical grooves 17, 17 on its working surface, adapted to form obliquely disposed, relatively thick zones 18, 18, in the rubber sheet 14. In apparatus such as is here shown, for producing tire-building strips of rubberized fabric, the grooves 17, 17 preferably have a pitch of approximately 45°, so that the fabric 16 with the rubber sheet 14 thereon may be bias-cut, at a 45° angle, between the thick zones 18, on the lines 14$^a$, 14$^a$, of Fig. 5, to produce the preferred type of tire-building strip.

For so cutting the fabric in the same operation in which it is coated, a roll or drum 19 is journaled in the calender frame below the roll 13 and provided with a set of helically disposed knives 20, 20 mounted upon its periphery and adapted to cut the work against the roll 13, the effective diameter of the drum, with the knives thereon, being the same as that of the grooved roll 12, said knives being of the same number and pitch and having the same spaced relation as the grooves 17, and said drum being geared in such angular relation to the roll 12 that said knives will engage and sever the work, as the latter is brought to them upon the periphery of the roll 13, midway between the thick zones of rubber 18 formed by said grooves. As here shown the three rolls 11, 12, 13 and the drum 19 are all of the same effective diameter and are provided with equal-sized, intermeshed driving gears, 11$^a$, 12$^a$, 13$^a$ and 19$^a$ respectively, and a main drive gear 13$^b$ is secured upon the trunnion of the roll 13, but I do not wholly limit my claims to this exact construction.

The knives 20, of flexible metal, are of triangular cross-section and each is held under longitudinal tension, in the form of a helical winding upon the drum, by anchor bolts such as 21 (Fig. 3), secured to their ends, mounted in respective brackets 22, 22 secured upon the end portions of the drum, and provided with nuts, such as 23 (Fig. 3), adapted to be set up to tighten said knives.

Each knife is provided with a resilient backing set in a helical groove in the face of the drum 19, said backing comprising an under layer 24 of soft rubber and an upper layer 25 of hard rubber vulcanized thereto, the latter being formed with a pair of longitudinal flanges 25$^a$, 25$^a$, between which the knife seats, to hold the knife against lateral displacement. The knife backing member 24—25 is held in its groove, preferably under compression, by small retaining plates 26, 26 spaced along its length and secured to the face of the drum by screws.

The drum 19 and associated parts embody features which are described and claimed in my United States Patents No. 1,577,619 and No. 1,577,620, both granted March 23, 1926.

Loosely journaled in the calender frame at the rear of the drum 19 is a guide roll 27 adapted to cause a liner 28 to pass partly around said drum, downwardly and forwardly, as said liner is drawn from a liner-supply roll 29 mounted at the rear of the calender to a liner and stock rewinding roll 30 mounted at the front of the calender and provided with any known or suitable friction drive (not shown). The liner 28 is thus adapted to hold the severed strips of the work in orderly relation against the drum 19 as they are cut and to carry them, in such relation, from said drum to the rewinding roll 30.

For supplying the continuous length of fabric 16, a stock roll 31 is journaled in suitable standards at the rear of the calender. 32 is a liner passing therefrom onto a liner-rewinding roll 33, provided with a suitable friction drive (not shown), as the fabric 16, which is interwound with said liner on the stock roll 31, passes to the calender.

In the operation of the apparatus, the liners 28, 32, the fabric 16 and the bank of stock 15 being mounted as shown in Fig. 1, and the rolls 11, 12, 13, drum 19, and rewinding rolls 30, 33 being driven in the directions indicated by the several arrows, the bank of stock 15 is continuously formed by the rolls 11, 12, into the rubber sheet 14 having the thick, oblique zones 18, the roll 12 preferably being kept at a higher temperature than the roll 11, to assure the adhesion of the sheeted stock to said roll 12. Said sheeted stock is progressively pressed, by the rolls 12, 13, onto the fabric 16, adhering thereto, and the fabric, thus coated, is severed into successive oblique strips by the knives 20 on the drum 19, acting against the hard, smooth surface of the roll 13. The severed strips, passing downward on said drum, are held in orderly relation against the latter by the moving liner 28, the friction drive of the rewinding roll 30 being such as to permit the liner to move at the same angular speed as the periphery of the drum, and as the liner passes from the drum to the rewinding roll 30 the strips are carried by the liner and interwound therewith onto said roll.

In producing tire strips the fabric 16 preferably is brought to the apparatus here shown after a thin coat of rubber has been applied to its reversed side by other apparatus, so that the strips, as wound onto the roll 30, are completely rubberized on both faces. As they lie in orderly relation in said roll, which may be carried about, they may be successively presented in position for rapid and convenient operation upon them by drawing the liner 28, with the strips thereon, from said roll. The strips may be formed and cut very accurately, as the plastic sheet 14 is supported upon the periphery of one or another of the rolls from the time it is formed until it is cut, and thus held against distortion, and the apparatus is adapted for economical operation, the rubber coating being applied and the strips severed in one continuous operation.

My invention is subject to modification within its scope and I do not wholly limit my claims to the exact character of work or to the specific construction of apparatus here shown.

I claim:

1. In apparatus for forming and cutting plastic material the combination of an embossed roll, a roll adapted to coact with the embossed roll to form an embossed sheet of stock, and a cutter timed with the embossed roll and mounted to cut the embossed sheet, from the embossed side thereof, on determinate lines with relation to the embossing.

2. In apparatus for forming and cutting plastic material, the combination of a pair of rolls adapted to form such material into a sheet, one of said rolls being formed with recesses in its working face adapted to form thick portions in said sheet, a rotary cutter having knives thereon in positions having determinate relation to the positions of the recesses in said roll, means for driving said recessed roll and said rotary cutter at equal peripheral speed, and timed means for receiving the work from said roll and presenting it to said cutter.

3. In apparatus for forming and cutting sheet material, the combination of a pair of rolls adapted to form a sheet of plastic material, one of said rolls being embossed, a third roll adapted to press said sheet against the embossed roll and receive the sheet therefrom, and a rotary cutter adapted to cut said sheet against said third roll.

4. In apparatus for forming and cutting plastic material the combination of fabric-supplying means, a calender having an embossed roll and adapted to withdraw fabric therefrom and to apply to the fabric an embossed coating of plastic material, and means adapted continuously to receive the coated fabric from the embossed roll as it is coated and to cut the fabric and the coating thereon as a unit on predetermined lines with relation to the embossing.

5. In apparatus for forming and cutting plastic material, the combination of means for progressively applying to a continuous length of material a plastic coating having thick and thin portions, and means timed with said coating-applying means and adapted to cut said material and said coating on determinate lines with relation to said portions as said material passes from said coating-applying means, the cutting means comprising a platen member on the uncoated side and a cutter on the coated side of the material.

6. In apparatus for forming and cutting plastic material, the combination of a pair of rolls adapted to form such material into a sheet, one of said rolls being formed with a helical groove adapted to form thick, obliquely disposed, zones in said sheet, said roll being adapted to carry said sheet on its periphery, a third roll adapted progressively to press a sheet of strength-giving material against the sheet of plastic material on said grooved roll, and means associated with said third roll for cutting the resulting structure successively between its thick zones.

7. In apparatus for forming and cutting plastic material, the combination of a pair of rolls adapted to form a sheet of plastic material, a third roll adapted to coact with one of said rolls to press said sheet onto a continuous length of strength-giving material and to carry the resulting structure upon its own periphery, a fourth roll provided with cutting means adapted to bear against said third roll to sever units from the work thereupon, a liner, and means for guiding said liner partly around said fourth roll to hold the severed units in orderly relation against said roll.

In witness whereof I have hereunto set my hand this 13 day of February, 1923.

JOHN R. GAMMETER.